United States Patent
Okada

(10) Patent No.: US 7,930,541 B2
(45) Date of Patent: Apr. 19, 2011

(54) E-MAIL COMMUNICATION APPARATUS

(75) Inventor: Kazuhiro Okada, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 691 days.

(21) Appl. No.: 11/957,536

(22) Filed: Dec. 17, 2007

(65) Prior Publication Data
US 2008/0162933 A1 Jul. 3, 2008

(30) Foreign Application Priority Data

Dec. 27, 2006 (JP) ................................. 2006-351274

(51) Int. Cl.
*H04L 9/00* (2006.01)
*H04L 9/32* (2006.01)

(52) U.S. Cl. ........... 713/168; 713/173; 713/189; 726/10

(58) Field of Classification Search .......... 713/165–170, 713/181, 173–176, 189–194; 726/2–4, 10–14
See application file for complete search history.

(56) References Cited

U.S. PATENT DOCUMENTS

| | | | | |
|---|---|---|---|---|
| 5,745,574 | A * | 4/1998 | Muftic | 713/157 |
| 6,028,938 | A * | 2/2000 | Malkin et al. | 713/176 |
| 2002/0101998 | A1 | 8/2002 | Wong et al. | |
| 2004/0133774 | A1 | 7/2004 | Callas et al. | |
| 2006/0112271 | A1 | 5/2006 | Soumiya et al. | |

FOREIGN PATENT DOCUMENTS

| | | |
|---|---|---|
| JP | 2000031957 A | 1/2000 |
| JP | 2000228727 A | 8/2000 |
| JP | 2002-208960 A | 7/2002 |
| JP | 2003036231 A | 2/2003 |
| JP | 2003-198632 A | 7/2003 |
| JP | 2003-338811 A | 11/2003 |
| JP | 2005-346424 A | 12/2005 |
| WO | 03/079628 A1 | 9/2003 |

OTHER PUBLICATIONS

Official communication issued in couterpart Japanese Application No. 2006-351274, mailed on Oct. 21, 2008.
Official communication issued in counterpart Japanese Application No. 2006-351274, mailed on Mar. 10, 2009.
Official Communication issued in corresponding European Patent Application No. 07023378.8, mailed on Sep. 4, 2009.
Stallings, "Cryptography and Network Security: Principles and Practice", Cryptography and Network Security: Principles and Practice, Jan. 1, 1998, pp. 182-185.

* cited by examiner

*Primary Examiner* — Hosuk Song
(74) *Attorney, Agent, or Firm* — Keating & Bennett, LLP

(57) ABSTRACT

An E-mail communication apparatus relays an E-mail transmitted from a source to a destination, stores information indicating a destination and an electronic certificate of the destination in a correspondence, receives the E-mail in which an address of the source and an address of the destination are specified; refers a certificate storage unit when a transmit command for the E-mail is issued for the E-mail received by a receiving unit, determines whether or not the electronic certificate of the destination of the E-mail is stored and, when the electronic certificate is stored, encrypts the E-mail with the electronic certificate, requests the destination to transmit the electronic certificate when it is determined that the electronic certificate is not stored, and transmits the encrypted request mail to the destination.

4 Claims, 7 Drawing Sheets

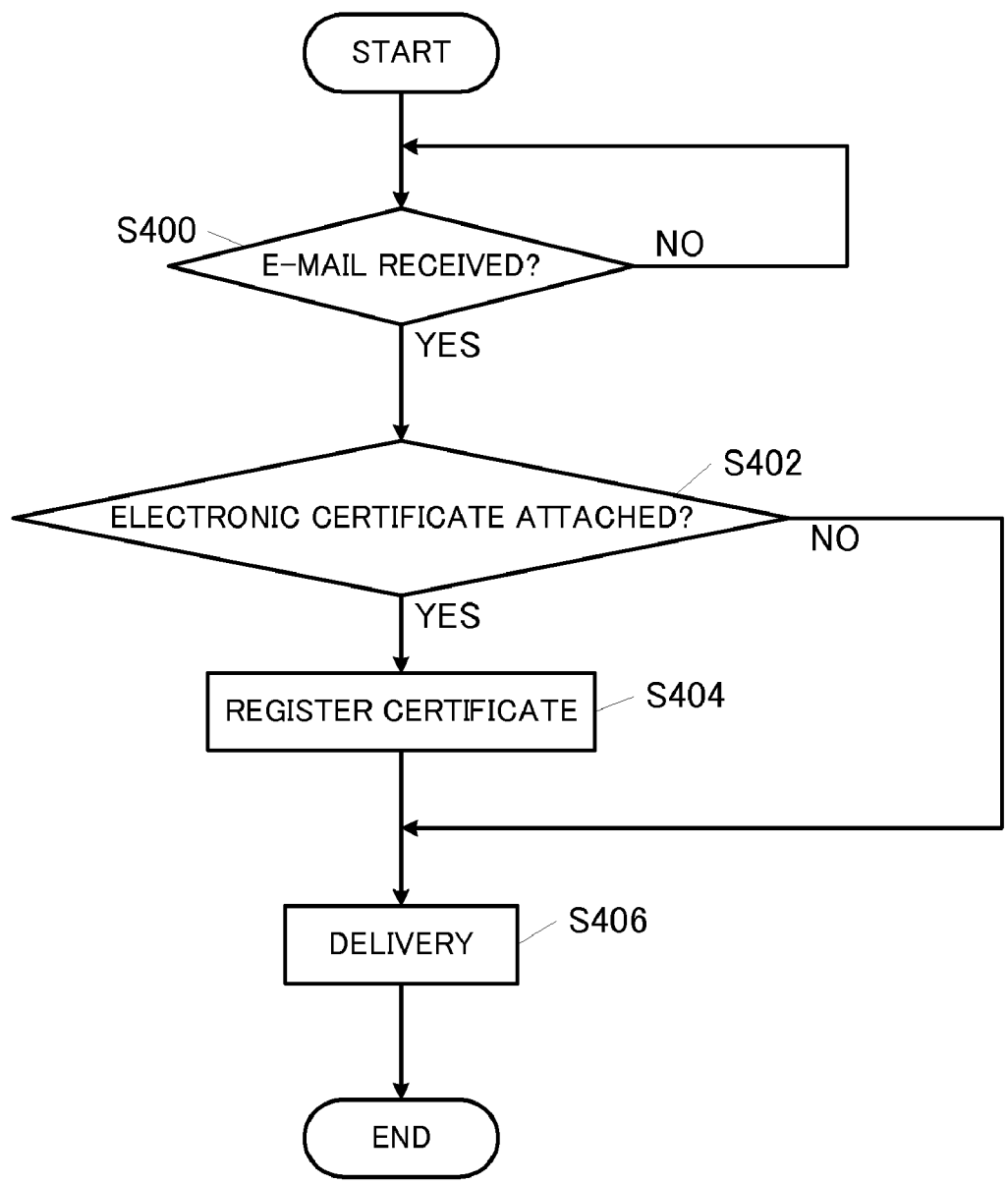

E-MAIL COMMUNICATION APPARATUS

CROSS-REFERENCE TO RELATED APPLICATIONS

This application claims priority under 35 U.S.C. 119 to Japanese Patent Application No. 2006-351274, filed on Dec. 27, 2006, which application is hereby incorporated by reference in its entirety.

BACKGROUND OF THE INVENTION

1. Field of the Invention

The present invention relates to an electronic mail (hereinafter, referred to as E-mail) communication apparatus and, more specifically, to an E-mail communication apparatus which is capable of transmitting mails as an encrypted data.

2. Description of the Related Art

In the related art, there is provided an E-mail communication apparatus including public key transmitting means for transmitting a new public key of an apparatus to E-mail addresses stored in address information storage means in advance when the public key of the apparatus is newly registered or renewed for the reason of expiration or the like. Accordingly, the new public key is efficiently transmitted to destinations of communication.

However, even though a destination terminal has the above-described function, if the source address is not stored in the address information storage means of the destination terminal, a new public key is not transmitted from the destination terminal, and the source cannot receive the public key. Therefore, when transmitting the encrypted mail, there may be a case that an electronic certificate (including the public key) of the destination terminal cannot be acquired.

SUMMARY OF THE INVENTION

In order to overcome the problems described above, preferred embodiments of the present invention provide a technology which improves convenience of transmission of encrypted E-mails.

According to a preferred embodiment of the present invention, an E-mail communication apparatus relays an E-mail transmitted from a source to a destination and includes: a certificate storage unit that stores information indicating a destination and an electronic certificate of the destination in a correspondence; a receiving unit that receives the E-mail in which an address of the source and an address of the destination are specified; an encrypting unit that refers the certificate storage unit when a transmit command for the E-mail is issued for the E-mail that the receiving unit receives, determines whether or not the electronic certificate of the destination of the E-mail is stored and, when the electronic certificate is stored, encrypts the E-mail with the electronic certificate; a request mail generating unit that generates a request mail for requesting the destination to transmit the electronic certificate when the encrypting unit determines that the electronic certificate is not stored; a transmitting unit that transmits the E-mail or the request mail encrypted by the encrypting unit to the destination; and a notification unit that transmits a notification mail including information which indicates that the request mail is transmitted to the destination and the electronic certificate is now being requested to the destination to the source of the E-mail when the transmitting unit has transmitted the request mail to the destination.

According to the E-mail communication apparatus of a preferred embodiment of the present invention, in a case in which an electronic certificate required for encryption is not registered when transmitting an E-mail which needs to be encrypted, a process to transmit a request mail for requesting the destination to transmit an electronic certificate is transmitted. Accordingly, the work required of a user when transmitting the encrypted E-mail is reduced, whereby the convenience is improved. The user on the source side receives a notification mail, and hence the user is able to know the event that the E-mail is not transmitted to the destination or the like, so that the user is able to take an action. Here, the notification unit may transmit the notification mail via Simple Mail Transfer Protocol (SMTP) to the source, or may allow the source to receive the notification mail from Post Office Protocol (POP) mail box of the source provided in the E-mail communication apparatus in advance.

The E-mail communication apparatus may further include the receiving unit that receives an E-mail, and a certificate acquiring unit that determines whether or not an electronic certificate of the source is attached to the E-mail that the receiving unit receives and, when it is determined that the electronic certificate is attached, stores the electronic certificate in the certificate storage unit in a correspondence with the source of the E-mail.

The E-mail communication apparatus may further include a storage unit that stores an E-mail transmitted from the transmitting unit, and the encrypting unit may store the E-mail to the destination in the storage unit as a waiting mail when it is determined that the electronic certificate is not stored, determine whether or not the waiting mail directed to the source is stored in the storage unit when it is determined that the electronic certificate is attached to the E-mail by the certificate acquiring unit and, when the waiting mail is stored, encrypt the waiting mail with the electronic certificate acquired by the certificate acquiring unit and make the transmitting unit to transmit the encrypted waiting mail.

When it is determined that the electronic certificate is not stored by the encrypting unit, the request mail generating unit may add a predetermined recognition information to the request mail to the destination, and the encrypting unit may store the waiting mail to the destination including the recognition information in the storage unit.

Accordingly, when the electronic certificate is transmitted from the destination, an action may be taken easily for the waiting mail.

According another preferred embodiment of the present invention, an E-mail communication apparatus relays an E-mail transmitted from a source to a destination and includes: a certificate storage unit that stores information indicating a destination and an electronic certificate of the destination in a correspondence; a receiving unit that receives a request mail which requests a destination to transmit an electronic certificate for encrypting the E-mail to be transmitted to the destination in association with specification of the destination; a transmitting unit that refers the certificate storage unit to determine whether or not the electronic certificate of the destination specified by the request mail is stored when the receiving unit has received the request mail and, when the electronic certificate is stored, transmits a return mail attached with the electronic certificate to the source of the request mail and, when the electronic certificate is not stored in the certificate storage unit, transfers the request mail to the destination specified by the request mail.

Accordingly, the work required of the user when receiving the encrypted E-mails is reduced and the convenience is improved.

Arbitrary combinations of the components shown above, and those obtained by converting the expressions in the present invention into "method", "apparatus", "system", "recording medium", and "computer program" are also effective as modes of the present invention.

According to various preferred embodiments of the present invention, the convenience when transmitting the encrypted E-mails is improved.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 7 is a flowchart illustrating a procedure of the transmitting end gateway according to a preferred embodiment of the present invention.

DETAILED DESCRIPTION OF PREFERRED EMBODIMENTS

Figure 1:
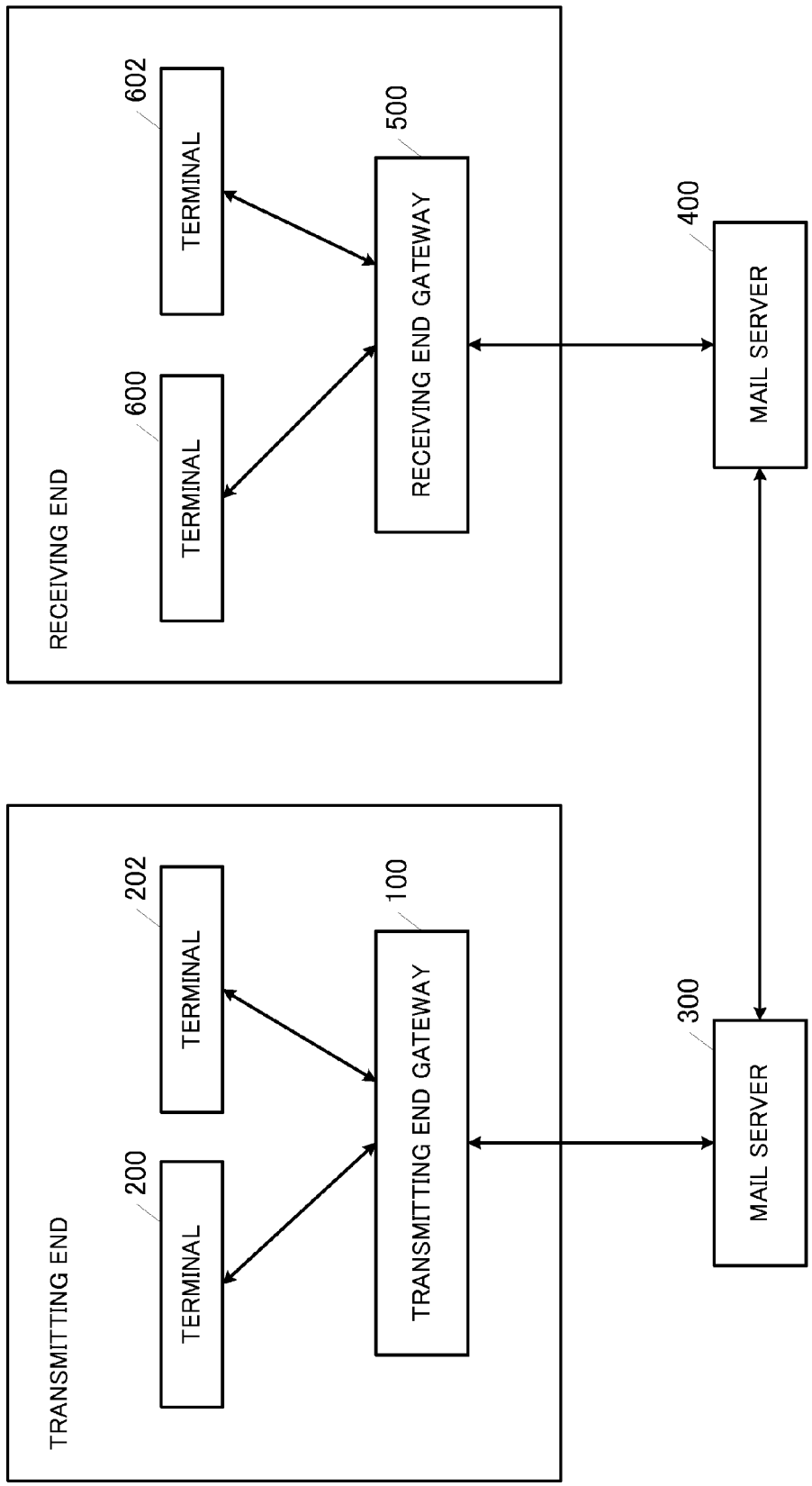
FIG. 1 is a block diagram illustrating a configuration of a network system including a transmitting end gateway and a receiving end gateway in a preferred embodiment of the present invention.

Referring now to the drawings, preferred embodiments of the present invention will be described. Like reference numerals are given to like parts throughout the drawings and the description will be omitted as needed. In the preferred embodiments described below, a transmitting end gateway will be exemplified as an E-mail communication apparatus in the present invention.

FIG. 1 is a block diagram illustrating a configuration of a network system including a transmitting end gateway 100 and a receiving end gateway 500 according to the present preferred embodiment.

In the present preferred embodiment, E-mails transmitted from a terminal 200 or a terminal 202 on the transmitting end to a terminal 600 and a terminal 602 on the receiving end pass through the transmitting end gateway 100, a mail server 300, a mail server 400, and the receiving end gateway 500. The transmitting end gateway 100 is connected to the terminal 200, the terminal 202 and the like to encrypt the E-mails transmitted from these terminals or attach the electronic signatures on the E-mails. The receiving end gateway 500 is connected to the terminal 600 and the terminal 602 via a network to verify electronic signatures attached to E-mails addressed to these terminals or decode encrypted E-mails. In the present preferred embodiment, the transmitting end gateway 100 is differentiated from the receiving end gateway 500.

However, the transmitting end gateway 100 and the receiving end gateway 500 are equivalent gateways having function of the both.

Between the terminals 200 and 202 and the transmitting end gateway 100 and between the terminals 600 and 602 and the receiving end gateway 500 are connected via a private network, for example, Local Area Network (LAN), respectively. Between the transmitting end gateway 100 and the mail server 300, between the mail server 300 and the mail server 400, and between the mail server 400 and the receiving end gateway 500 may be connected via an external network such as an internet.

For example, when the terminal 200 and the transmitting end gateway 100 are connected to a private network such as an in-company network, E-mails transmitted and received therebetween do not have to be encrypted. In contrast, it is preferable to encrypt E-mails transmitted to the external network such as the internet. In the present preferred embodiment, the transmitting end gateway 100 is capable of encrypting E-mails to be transmitted to the external network as needed and transmitting them to the external network on the basis of user's instructions or the like.

In the same manner, for example, when the receiving end gateway 500 and the terminal 600 are connected via the in-company network, E-mails to be transmitted and received therebetween do not have to be encrypted. In the present preferred embodiment, the receiving end gateway 500 receives E-mails transmitted from the external network to the terminals connected to the in-company network and decodes these E-mails if encrypted, or verifies electronic signatures if attached.

In the present preferred embodiment, the transmitting end gateway 100 and the receiving end gateway 500 have a function to transmit and receive E-mails in a Secure Multipurpose Internet Mail Extensions (S/MIME) system on the basis of Public Key Infrastructure (PKI).

Figure 2:
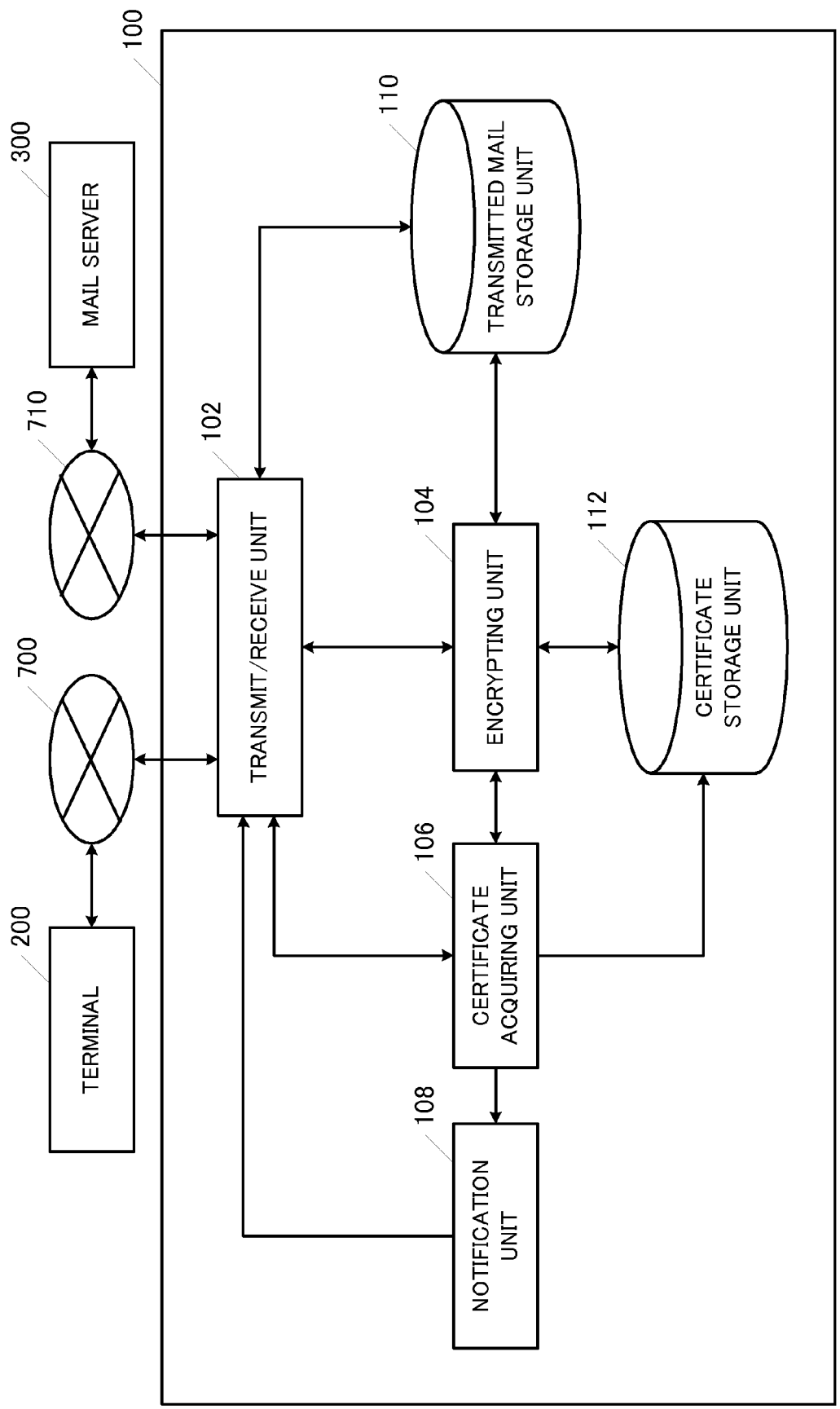
FIG. 2 is a block diagram illustrating a configuration of the transmitting end gateway according to a preferred embodiment of the present invention.

FIG. 2 is a block diagram illustrating a configuration of the transmitting end gateway 100 in the present preferred embodiment. The transmitting end gateway 100 includes a transmit/receive unit 102, an encrypting unit 104, a certificate acquiring unit 106 (including a function as a request mail generating unit), a notification unit 108, a transmitted mail storage unit 110, and a certificate storage unit 112.

The certificate storage unit 112 stores destinations and electronic certificates of the destinations in a correspondence. The certificate storage unit 112 is able to store the destinations with E-mail addresses thereof. The electronic certificate includes certificate information such as a public key, a term of validity, an algorithm of the public key, and a signature algorithm of a certificate authority. The electronic certificate may include the mail address of the destination.

The transmit/receive unit 102 receives an E-mail transmitted from the terminal 200 to a terminal such as the terminal 600 via a private network 700 together with a specification of destination and a transmit command. The transmit/receive unit 102 also receives an encryption command for the E-mail together with transmit command of the E-mail.

When the encrypting unit 104 receives an encryption command together with a transmit command of an E-mail, it refers the certificate storage unit 112 and determines whether or not an electronic certificate of the destination of the E-mail is stored. The encryption command may be included in each E-mail, or may be set on the side of the apparatus. The encrypting unit 104 determines whether or not an electronic certificate of the corresponding destination is stored in the certificate storage unit 112. When the electronic certificate is stored in the certificate storage unit 112, the encrypting unit 104 determines that the electronic certificate is stored. When the electronic certificate is stored, the encrypting unit 104 encrypts the corresponding E-mail with a public key included in the electronic certificate. The transmit/receive unit 102 transmits the E-mail encrypted by the encrypting unit 104 to the destination.

In contrast, when the electronic certificate is not stored, the encrypting unit 104 stores the E-mail to the destination in the transmitted mail storage unit 110 as a waiting mail. In this case, the transmit/receive unit 102 does not transmit the E-mail.

When the encrypting unit 104 has determined that the electronic certificate is not stored, the certificate acquiring unit 106 generates a request mail for requesting an electronic certificate to the destination. The certificate acquiring unit 106 adds information to make a receiver recognize that it is a mail which requests an electronic certificate to the request mail. The certificate acquiring unit 106 is capable of adding a keyword that indicates that it is a mail to request an electronic certificate, for example, in a MIME extension header, a text, or a subject. The keyword may be an extension header such as "X-RequestCert: mail address", but is not limited thereto.

When the electronic certificate is attached by providing an electronic signature, the certificate acquiring unit 106 is also capable of adding a message to request a response with an electronic signature in the request mail in the form of character information. The certificate acquiring unit 106 is also capable of adding recognition information to the request mail. In this case, the same recognition information as the one added to the request mail may be attached to the waiting mail stored in the transmitted mail storage unit 110. Accordingly, when the electronic certificate is transmitted from the destination, an action may be taken easily for the waiting mail.

The transmit/receive unit 102 transmits the request mail generated by the certificate acquiring unit 106 to the destination via an external network 710.

When the transmit/receive unit 102 transmits the request mail generated by the certificate acquiring unit 106 to the destination, the notification unit 108 generates a notification mail to be transmitted to a source. Here, the notification unit 108 adds the effect that the E-mail could not be transmitted because of the absence of the electronic certificate, the destination that failed to transmit the E-mail, the effect that the request of the electronic certificate is transmitted to the destination, and the effect that the E-mails will be re-transmitted when the electronic certificate is acquired to the notification mail. Here, retransmitting may be done again by the user as the source, and in this case, this effect is added to the notification mail.

The transmit/receive unit 102 receives E-mails from external terminals via the external network 710. The certificate acquiring unit 106 determines whether or not the electronic certificate of the source is attached to the E-mail that the transmit/receive unit 102 receives via the external network 710. More specifically, the certificate acquiring unit 106 determines whether or not the E-mail that the transmit/receive unit 102 receives is a return mail for the request mail. Whether it is a return mail for the request mail or not is determined by adapting a keyword added to the MIME extension header, the text, or the subject of the request mail to be included in the return mail, and determining whether or not the keyword is included.

Subsequently, the certificate acquiring unit 106 stores the acquired electronic certificate in the certificate storage unit 112 in a correspondence with the E-mail address of the source.

When it is determined that the electronic certificate is attached to the E-mail by the certificate acquiring unit 106, the encrypting unit 104 determines whether or not a waiting mail to the source is stored in the transmitted mail storage unit 110. In the present preferred embodiment, the same recognition information may be added to the request mail generated by the certificate acquiring unit 106 and to the waiting mail stored in the transmitted mail storage unit 110 by the encrypting unit 104, and the same recognition information may also be added to the return mail for the request mail as well as described above. In this case, the encrypting unit 104 is able to determine whether or not the waiting mail to the source of the return mail is stored in the transmitted mail storage unit 110 using the recognition information as a key. The encrypting unit 104 is also able to determine whether or not the waiting mail to the source is stored in the transmitted mail storage unit 110 using E-mail addresses of the destination of the waiting mail and the source of the return mail as a key.

When the waiting mail is stored in the transmitted mail storage unit 110, the encrypting unit 104 encrypts the waiting mail with the electronic certificate acquired by the certificate acquiring unit 106. Then, the transmit/receive unit 102 transmits the encrypted E-mail.

In the description given above, the case in which the transmitting end gateway 100 re-transmits the E-mail is exemplified. However, re-transmitting may be adapted to be done by the user of the terminal on the source side. In this case, the encrypting unit 104 needs not store the E-mail to the destination in the transmitted mail storage unit 110 as a waiting mail. In this case, when the certificate acquiring unit 106 acquires the electronic certificate from the destination, the notification unit 108 is able to transmit a notification mail which notifies that effect to the source. Accordingly, the user of the terminal on the source side may issue a command to transmit the E-mail to the destination again. When such a command is included in the return mail for the request mail, the encrypting unit 104 determines that the electronic certificate is stored. Therefore, the encryption is carried out, and the E-mail is transmitted to the destination. As another example, when having received an E-mail including an electronic certificate attached thereto, the transmit/receive unit 102 may store the attached electronic certificate in the certificate storage unit 112 without considering whether or not the E-mail is a return mail for the request mail, and deliver the E-mail to the terminal of the destination as is. In this case as well, the user of the terminal on the source side may issue a command to transmit the E-mails to the destination again.

Figure 3:
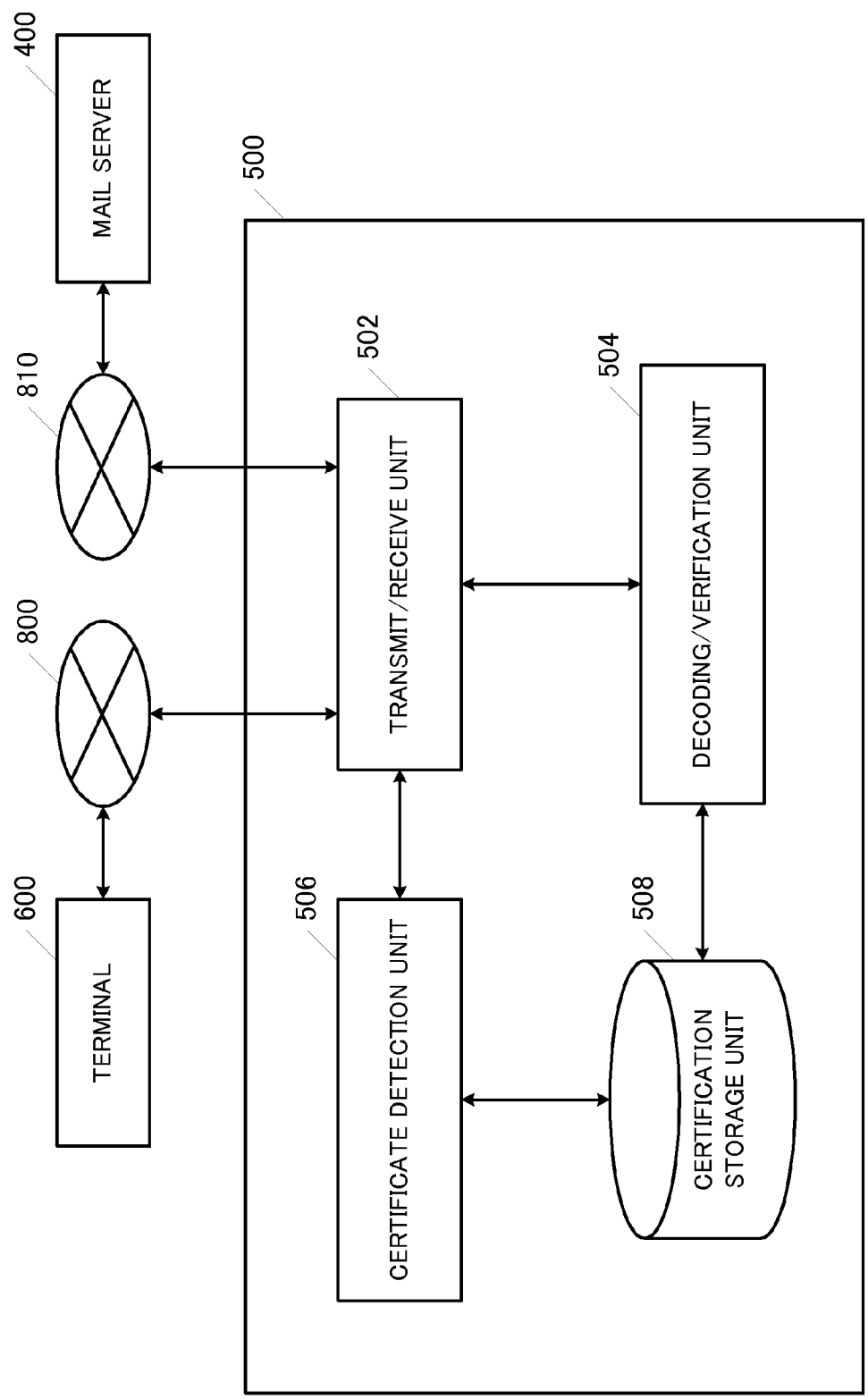
FIG. 3 is a block diagram illustrating a configuration of the receiving end gateway according to a preferred embodiment of the present invention.

FIG. 3 is a block diagram illustrating a configuration of the receiving end gateway 500. The receiving end gateway 500 includes a transmit/receive unit 502, a decoding/verification unit 504, a certificate detection unit 506, and a certification storage unit 508.

The transmit/receive unit 502 transmits and receives E-mails. The certification storage unit 508 stores E-mail addresses of the terminal 600 or the like connected to the receiving end gateway 500 via a private network 800 and an electronic certificate thereof in a correspondence. Here, the electronic certificate includes certificate information such as a public key, a term of validity, an algorithm of the public key, and a signature algorithm of a certificate authority. The certification storage unit 508 may store digital signatures of the respective terminals in correspondence with E-mail addresses thereof. The electronic certificate may have a configuration including an E-mail address of each terminal.

When the transmit/receive unit 502 receives a request mail which requests the electronic certificate, the certificate detection unit 506 carries out processing for detecting the requested electronic certificate. The certificate detection unit 506 firstly refers the certification storage unit 508, and determines whether or not the requested electronic certificate is stored. When the requested electronic certificate is stored in the certification storage unit 508, the certificate detection unit 506 attaches the electronic certificate to the return mail for the request mail as an attached file. The certificate detection unit 506 may carry out processing to embed an electronic certificate in a predetermined field by providing a digital signature of the corresponding terminal. The transmit/receive unit 502 transmits the return mail to the transmitting end gateway 100 which is the source of the request mail.

On the other hand, when the required electronic certificate is not stored in the certification storage unit 508, the certificate detection unit 506 makes the transmit/receive unit 502 deliver the request mail transmitted from the transmitting end gateway 100 to the terminal which is specified as the destination. A message to request a return mail with a signature and a certificate attached is added to the certificate request mail.

The transmit/receive unit 502 determines whether or not decoding or verification of the E-mail received via an external network 810 is necessary. For example, the transmit/receive unit 502 determines that the decoding is necessary when the received E-mail is encrypted. Whether or not the E-mail is encrypted or not is determined by the header of S/MIME. The decoding/verification unit 504 decodes the E-mail when it is encrypted. When the electronic signature is attached, the decoding/verification unit 504 verifies the presence or absence of alteration. The certification storage unit 508 may store the electronic certificate of the source to be used by the decoding/verification unit 504 when verifying the presence or absence of alteration on the basis of the electronic signature or a decoding key used when decoding.

Figure 4:
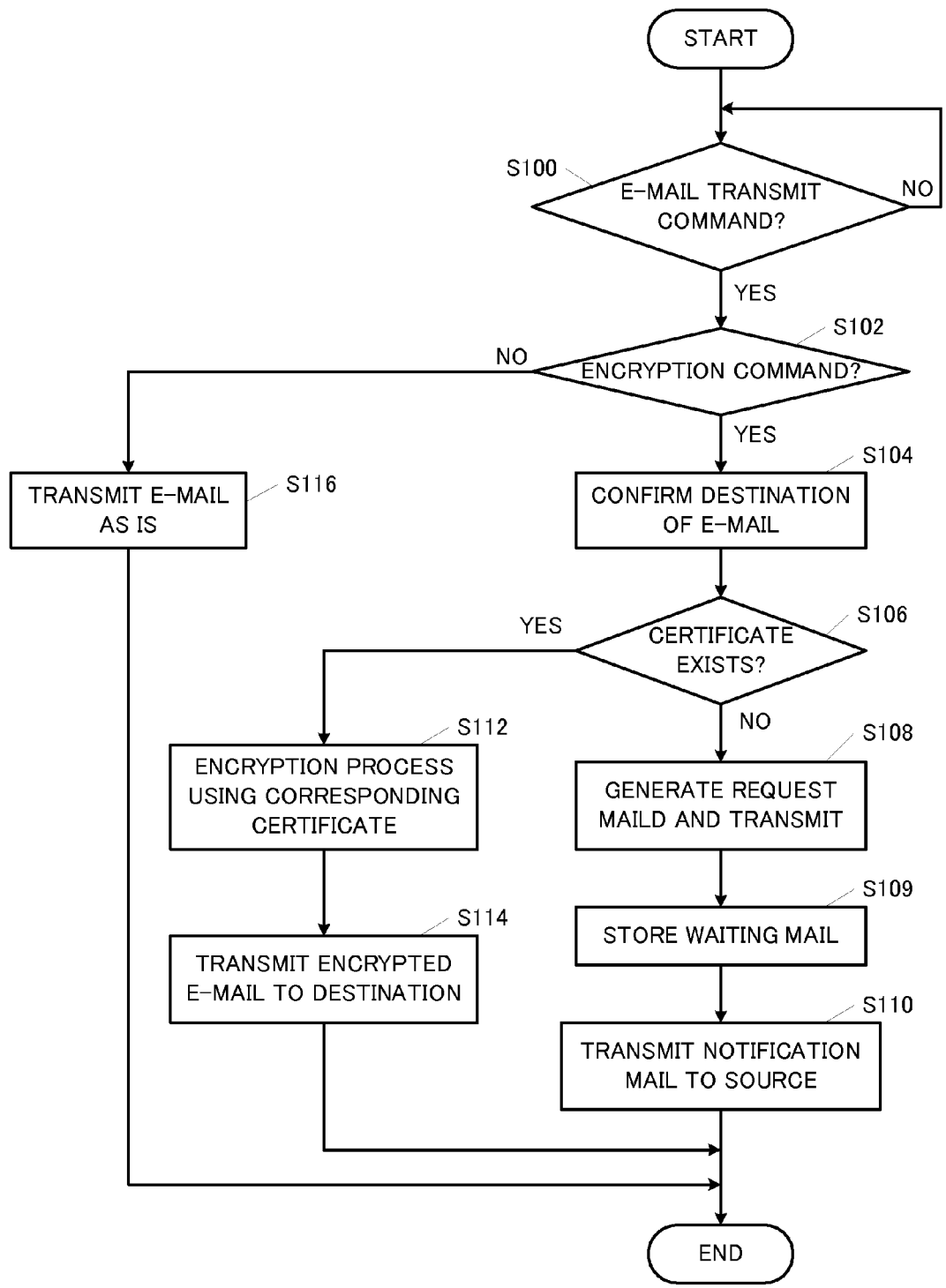
FIG. 4 is a flowchart illustrating a procedure of the transmitting end gateway according to a preferred embodiment of the present invention.

FIG. 4 is a flowchart illustrating a procedure taken in the transmitting end gateway 100. When the transmit/receive unit 102 receives an E-mail transmit command (YES in S100), it determines whether or not an encryption command is issued (S102). When the encryption command is not issued (NO in S102), the transmit/receive unit 102 transmits the E-mail to the destination as is (S116). In contrast, when the encryption command is issued (YES in S102), the encrypting unit 104 confirms the destination of the E-mail (S104), and refers the certificate storage unit 112 to determine whether or not the electronic certificate corresponding to the destination is stored (S106).

When the electronic certificate is stored (YES in S106), the encrypting unit 104 encrypts the E-mail using the corresponding electronic certificate (S112). Subsequently, the transmit/receive unit 102 transmits the E-mail encrypted by the encrypting unit 104 to the destination (S114).

In contrast, when the electronic certificate is not stored in Step S106 (NO in S106), the certificate acquiring unit 106 generates a request mail which requests an electronic certificate in a normal text. The transmit/receive unit 102 transmits the request mail generated by the certificate acquiring unit 106 (S108). At this time, the destination of the request mail may be the destination of the original E-mail.

The encrypting unit 104 stores the E-mail which is failed to be transmitted due to the absence of the electronic certificate in the transmitted mail storage unit 110 as a waiting mail (S109). The notification unit 108 then transmits a notification mail to the source address (S110).

Figure 5:
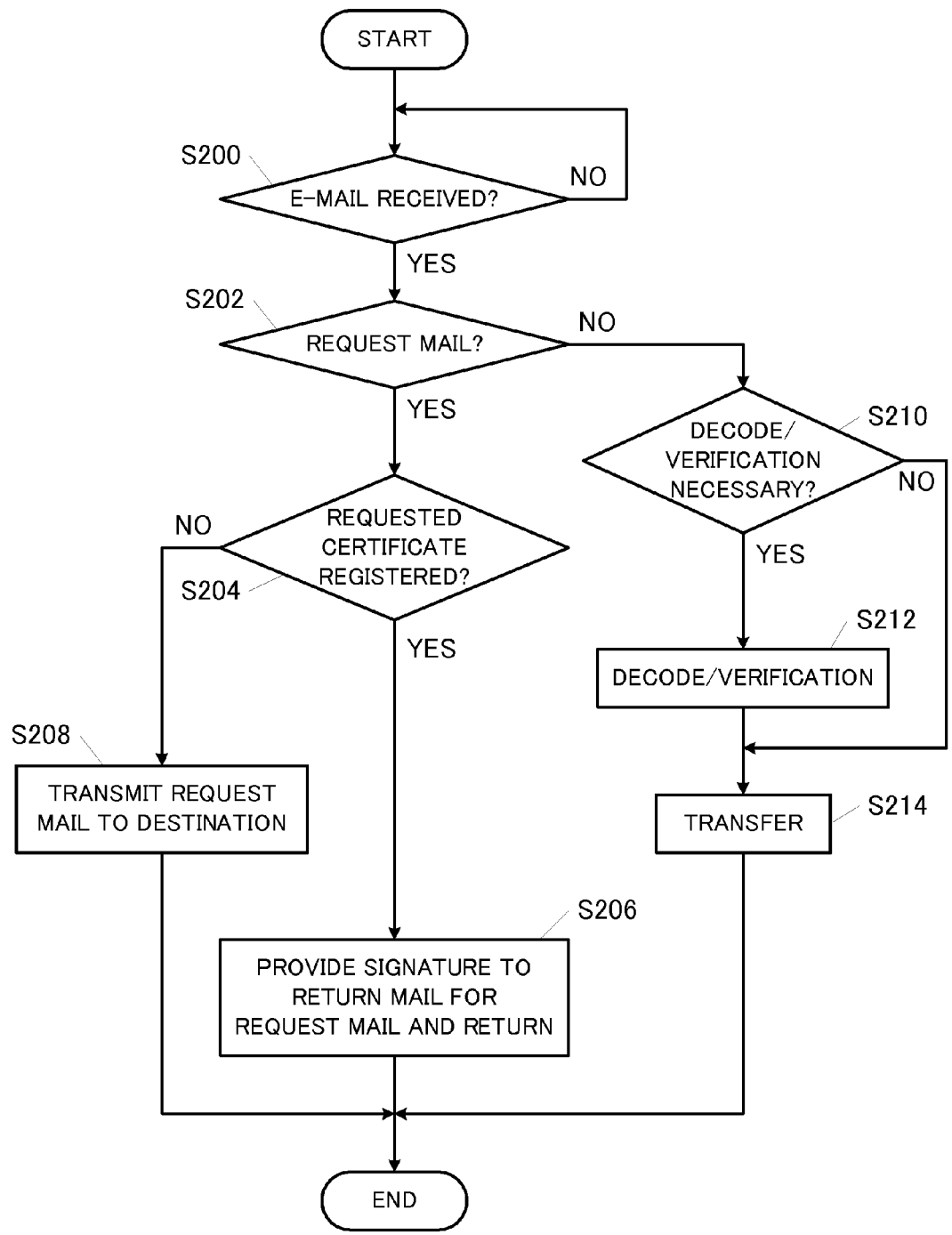
FIG. 5 is a flowchart illustrating a procedure of the receiving end gateway according to a preferred embodiment of the present invention.

FIG. 5 is a flowchart illustrating a procedure done by the receiving end gateway 500 in the present preferred embodiment. When the transmit/receive unit 502 receives an E-mail via the external network 810 (YES in S200), it determines whether or not the E-mail is a request mail which requests the electronic certificate (S202). When the E-mail is a request mail requesting the electronic certificate (YES in S202), the certificate detection unit 506 refers the certification storage unit 508 and determines whether or not the requested electronic certificate is stored in the certification storage unit 508 (S204). When the requested electronic certificate is stored in the certification storage unit 508 (YES in S204), the certificate detection unit 506 provides a signature to the request mail which requests the electronic certificate and returns the request mail as is (S206).

In contrast, when the requested electronic certificate is not stored in the certification storage unit 508 in Step S204 (NO in S204), the certificate detection unit 506 delivers the request mail for requesting the destination terminal (client) to transmit the electronic certificate as is via the transmit/receive unit 502 (S208).

When the E-mail is not the request mail which requests the electronic certificate in Step S202 (NO in S202), the transmit/receive unit 502 determines whether or not decoding or verification of the E-mail is necessary (S210). When the decoding or the verification is necessary (YES in S210), the transmit/receive unit 502 makes the decoding/verification unit 504 to carry out the decoding or the verification (S212). Then, the transmit/receive unit 502 transfers the decoded E-mail to the destination terminal (S214). When neither the decoding nor the verification is necessary in Step S210 (NO in S210), the transmit/receive unit 502 transfers the received E-mail to the destination terminal as is.

Figure 6:
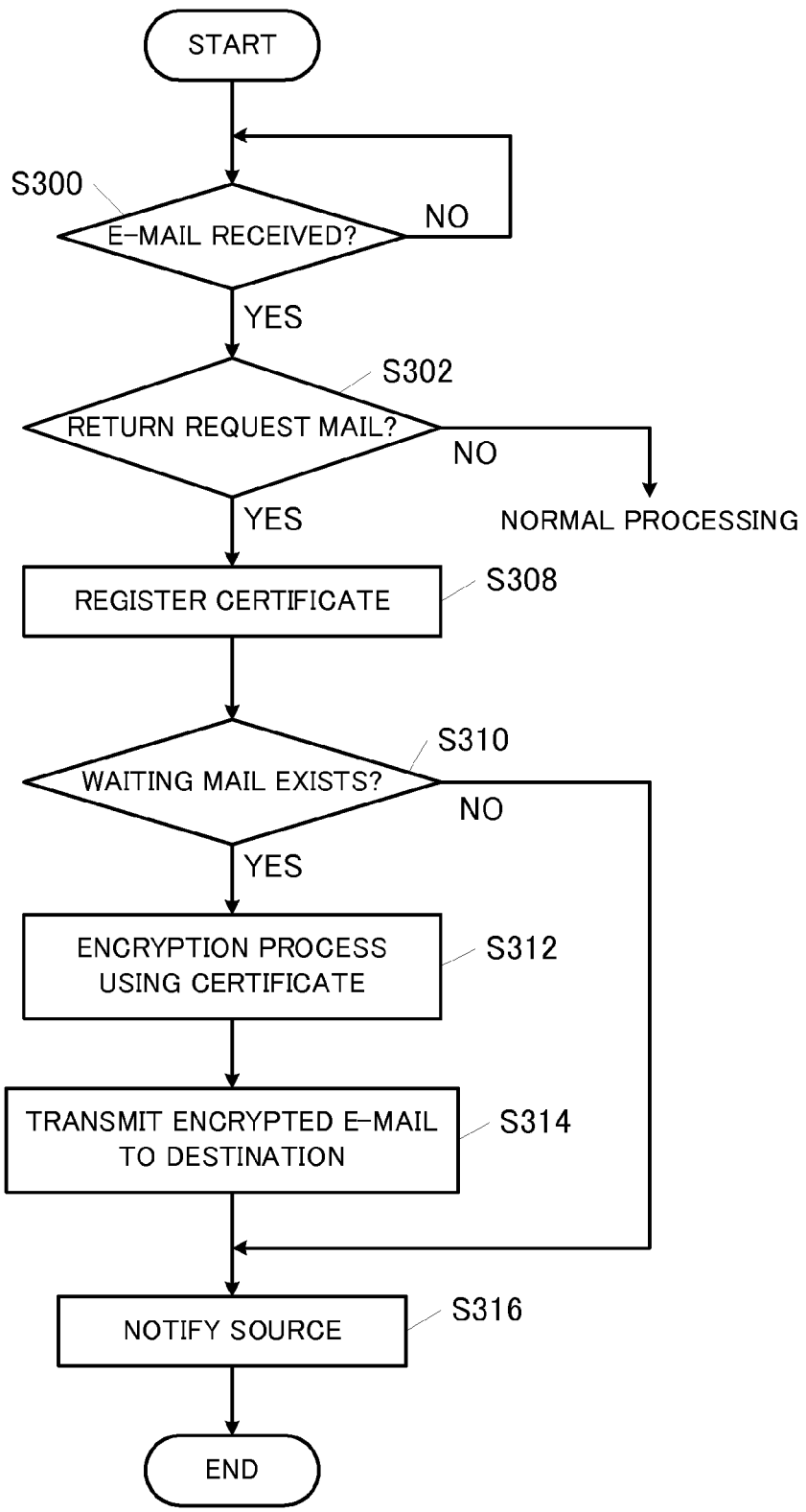
FIG. 6 is a flowchart illustrating a procedure of the transmitting end gateway according to a preferred embodiment of the present invention.

FIG. 6 is a flowchart illustrating a procedure of the transmitting end gateway 100 in the present preferred embodiment. When the transmit/receive unit 102 receives an E-mail via the external network 710 (YES in S300), it determines whether or not the E-mail is a return mail for the request mail (S302). If the determination result is yes, (YES in S302), the acquired electronic certificate is stored in the certificate storage unit 112 (S308).

Subsequently, the encrypting unit 104 determines whether or not a waiting mail is stored in the transmitted mail storage unit 110 (S310), and if the determination result is yes (YES in S310), carries out encryption using the electronic certificate stored in the certificate storage unit 112 (S312). Then, the transmit/receive unit 102 transmits the E-mail encrypted by the encrypting unit 104 to the destination (S314).

Then, the notification unit 108 transmits a notification mail for notifying the reception of the return mail for the request mail to the source (S316). At this time, the effect that the E-mail is encrypted by the acquired electronic certificate and the E-mail is transmitted to the destination may be included in the notification. Accordingly, the original sender of the E-mail is able to know the fact that the E-mail is transmitted to the destination and the electronic certificate is acquired. When there is no waiting mail in Step S310 (No in S310), the procedure goes to Step S316 and the notification indicating the effect that the electronic certificate is acquired is given.

In Step S302, the received mail is not a return mail for the request mail (NO in S302), the normal E-mail receiving process is performed.

FIG. 7 is a flowchart illustrating another example of the procedure of the transmitting end gateway 100 in the present preferred embodiment. Here, an example of a case in which the user of the terminal on the source side retransmits the E-mail when the electronic certificate of the destination is acquired for the request mail will be described.

When the transmit/receive unit 102 receives an E-mail via the external network 710 (YES in S400), it determines whether or not the electronic certificate is attached to the E-mail (S402). When the electronic certificate is attached (YES in S402), the acquired electronic certificate is stored in the certificate storage unit 112 (S404).

Subsequently, the transmit/receive unit 102 delivers the E-mail to the destination of the E-mail (that is the source of the E-mail in Step S200 in FIG. 5) (S406). When the electronic certificate is not attached in Step S402 (NO in S402), the normal process, that is, delivery to the destination is carried out.

A detailed example of the transmitting end gateway 100 in the present preferred embodiment will be described. For example, when transmitting encrypted E-mails to a plurality of destinations, the transmitting end gateway 100 encrypts the E-mail with the corresponding electronic certificates for the destinations whose electronic certificates are registered and transmits the E-mails. In contrast, the transmitting end gateway 100 transmits a request mail for requesting the destination whose electronic certificates are not registered to transmit an electronic certificate in a normal text. In this case, the transmitting end gateway 100 transmits a notification mail which includes the effect that the E-mail could not be transmitted because the electronic certificate is not registered, the effect that the electronic certificate is now being requested, and the effect that the E-mail will be retransmitted when the return mail for the request mail is arrived to the source. According to the transmitting end gateway 100 in the present preferred embodiment, the processes as such are done automatically.

As described above, according to the transmitting end gateway 100 in the present preferred embodiment, in a case in which an electronic certificate which is necessary for encryption is not registered when transmitting an E-mail which requires encryption, a process to transmit a request mail for requesting the destination to transmit the electronic certificate and, when the electronic certificate is acquired, the process of encrypting and transmitting the E-mail is carried out. Accordingly, a labor of the user when transmitting the encrypted E-mail may be reduced, whereby the convenience is improved.

Respective components of the transmitting end gateway 100 and the receiving end gateway 500 shown in FIG. 2 and FIG. 3 illustrate blocks on the basis of the unit of function instead of the unit of hardware. The respective components of the transmitting end gateway 100 and the receiving end gateway 500 are implemented by combining arbitrarily hardware and software mainly including a CPU of an arbitrary computer, a memory, a program loaded in the memory to implement the components in the drawing, a storage unit such as hard disk for storing the program, and a network connection interface. Those skilled in the art will understand that the method and the device for the implementation include various modifications. In the respective drawings, those which do not relate to the essential qualities are omitted.

Preferred embodiments of the present invention have been described thus far with reference to the drawings, and are illustrative only, and various other configurations other than those shown above may also be employed.

In the preferred embodiments described above, an example in which the E-mail communication apparatus is the transmitting end gateway 100 has been described. However, the E-mail communication apparatus may be used as a mail server such as the mail server 300. In other words, the respective components described as functions of the transmitting end gateway 100 may be included in the mail server such as the mail server 300. The E-mail communication apparatus here may be, for example, a personal computer, a work station, an internet facsimile apparatus, Multi Functional Peripheral (MFP), and so on.

When the transmit/receive unit 102 has transmitted a request mail to any one of the destinations, the certificate acquiring unit 106 records it and monitors whether or not a return mail is returned or an electronic certificate is acquired. When no mail is returned or when the electronic certificate cannot be acquired after having elapsed a predetermined time period, the certificate acquiring unit 106 may make the notification unit 108 notify that effect to the user.

While the present invention has been described with respect to preferred embodiments thereof, it will be apparent to those skilled in the art that the disclosed invention may be modified in numerous ways and may assume many embodiments other than those specifically set out and described above. Accordingly, the appended claims are intended to cover all modifications of the present invention that fall within the true spirit and scope of the present invention.

What is claimed is:

1. An E-mail communication apparatus which relays an E-mail transmitted from a source to a destination, comprising:
    a certificate storage unit that stores information indicating a destination and an electronic certificate of the destination in a correspondence;
    a receiving unit that receives the E-mail in which an address of the source and an address of the destination are specified;
    an encrypting unit that refers to the certificate storage unit when a transmit command for the E-mail is issued for the E-mail received by the receiving unit, determines whether or not the electronic certificate of the destination of the E-mail is stored and, when the electronic certificate is stored, encrypts the E-mail with the electronic certificate;
    a request mail generating unit that generates a request mail for requesting the destination to transmit the electronic certificate when the encrypting unit determines that the electronic certificate is not stored;
    a transmitting unit that transmits the E-mail or the request mail encrypted by the encrypting unit to the destination;
    a notification unit that transmits a notification mail including information which indicates that the request mail is transmitted to the destination and the electronic certificate is now being requested to the destination to the source of the E-mail when the transmitting unit has transmitted the request mail to the destination;
    a certificate acquiring unit that determines whether or not an electronic certificate of the source is attached to the E-mail that the receiving unit receives and, when it is determined that the electronic certificate is attached, stores the electronic certificate in the certificate storage unit in a correspondence with the source of the E-mail; and
    a storage unit that stores an E-mail transmitted from the transmitting unit; wherein
    the encrypting unit stores the E-mail to the destination in the storage unit as a waiting mail when it is determined that the electronic certificate is not stored, determines whether or not the waiting mail directed to the source is stored in the storage unit when it is determined that the electronic certificate is attached to the E-mail by the certificate acquiring unit and, when the waiting mail is stored, encrypts the waiting mail with the electronic certificate acquired by the certificate acquiring unit and makes the transmitting unit to transmit the encrypted waiting mail.

2. The E-mail communication apparatus according to claim 1, wherein when it is determined that the electronic certificate is not stored by the encrypting unit, the request mail generating unit adds a predetermined recognition information to the request mail to the destination, and the encrypting unit stores the request mail to the destination including the recognition information in the storage unit.

3. A method of controlling an E-mail communication apparatus which relays an E-mail transmitted from a source to a destination, the method comprising:

a step of receiving the E-mail in which an address of the source and an address of the destination are specified;

a step of referring to a certificate storage unit in which information indicating a destination and an electronic certificate of the destination are stored in a correspondence when a transmit command for the E-mail is issued for the E-mail received by a receiving unit and determining whether or not the electronic certificate of the destination of the E-mail is stored;

a step of encrypting the E-mail with the electronic certificate when the electronic certificate is stored;

a step of generating a request mail for requesting the destination to transmit the electronic certificate when an encrypting unit determines that the electronic certificate is not stored;

a step of transmitting the encrypted E-mail or request mail to the destination;

a step of transmitting a notification mail including information which indicates that the request mail is transmitted to the destination and the electronic certificate is now being requested to the destination to the source of the E-mail when the request mail is transmitted to the, destination;

a step of determining whether or not an electronic certificate of the source is attached to the received E-mail; and a step of storing the electronic certificate in the certificate storage unit in a correspondence with the source of the E-mail when it is determined that the electronic certificate is attached; wherein the step of encrypting further includes:

a step of storing the E-mail to the destination in a storage unit for storing an E-mail to be transmitted as a waiting mail in the storage unit when it is determined that the electronic certificate is not stored; and a step of determining whether or not the waiting mail directed to the source is stored in the storage unit when it is determined that the electronic certificate is attached to the E-mail by the certificate acquiring unit and, when the waiting mail is stored, encrypting the waiting mail with the electronic certificate acquired by the certificate acquiring unit and causing the transmitting unit to transmit the encrypted waiting mail.

4. The method of controlling an E-mail communication apparatus according to claim 3 further comprising a step of adding a predetermined recognition information to the request mail to the destination when it is determined that the electronic certificate is not stored and storing the waiting mail to the destination including the recognition information in the storage unit.

* * * * *